US009783296B2

(12) United States Patent
Ray et al.

(10) Patent No.: US 9,783,296 B2
(45) Date of Patent: Oct. 10, 2017

(54) AIRCRAFT STORE DEPLOYMENT SYSTEM WITH IMPROVED SAFETY OF ARMING AND RELEASING STORES

(71) Applicant: Raytheon Company, Waltham, MA (US)

(72) Inventors: Michael S. Ray, Carmel, IN (US); Armando Guerrero, Columbus, IN (US)

(73) Assignee: Raytheon Company, Waltham, MA (US)

( * ) Notice: Subject to any disclaimer, the term of this patent is extended or adjusted under 35 U.S.C. 154(b) by 206 days.

(21) Appl. No.: 14/532,121

(22) Filed: Nov. 4, 2014

(65) Prior Publication Data

US 2016/0083089 A1    Mar. 24, 2016

Related U.S. Application Data

(60) Provisional application No. 62/052,292, filed on Sep. 18, 2014.

(51) Int. Cl.
*B64D 7/08*     (2006.01)
*B64D 1/06*     (2006.01)
*F41F 3/06*     (2006.01)
*B64D 1/04*     (2006.01)

(52) U.S. Cl.
CPC ............. *B64D 1/06* (2013.01); *B64D 1/04* (2013.01); *B64D 7/08* (2013.01); *F41F 3/06* (2013.01)

(58) Field of Classification Search
CPC .............. B64D 1/06; B64D 1/04; B64D 7/08
USPC ...................................................... 244/137.4
See application file for complete search history.

(56) References Cited

U.S. PATENT DOCUMENTS

| 2,756,091 A | 7/1956 | Komerska |
| 3,598,341 A | 8/1971 | La Roe et al. |
| 3,799,478 A | 3/1974 | Costes et al. |
| 3,883,097 A | 5/1975 | Billot |
| 3,954,233 A | 5/1976 | Hasquenoph et al. |
| 4,008,645 A | 2/1977 | Herbert |

(Continued)

FOREIGN PATENT DOCUMENTS

GB        2280736 A        8/1995

OTHER PUBLICATIONS

International Search Report and Written Opinion from corresponding International Application No. PCT/US2015/042855, mailed on Mar. 14, 2016.

*Primary Examiner* — Justin Benedik
(74) *Attorney, Agent, or Firm* — Renner, Otto, Boisselle & Sklar, LLP

(57) ABSTRACT

A deployment system for deploying a store from an aircraft includes a lock member that selectively engages the store to the deployment system, an ejector that selectively ejects the store from the deployment system, and a deployment system controller communicatively coupled to the lock member and to the ejector, the system controller communicatively coupled to the aircraft to receive commands from the aircraft, wherein upon receipt of a master arm command from the aircraft the system controller maintains the lock member in an engaged state relative to the store, and wherein upon receipt of a fire command from the aircraft the system controller disengages the lock member from the store and activates the ejector to eject the store from the deployment system.

20 Claims, 12 Drawing Sheets

(56) References Cited

U.S. PATENT DOCUMENTS

| | | | |
|---|---|---|---|
| 4,049,222 A | 9/1977 | Peterson | |
| 4,050,656 A | 9/1977 | Peterson | |
| 4,129,271 A | 12/1978 | Hasquenoph et al. | |
| 4,168,047 A | 9/1979 | Hasquenoph et al. | |
| 4,257,639 A | 3/1981 | Stock | |
| 4,388,853 A | 6/1983 | Griffin et al. | |
| 4,412,475 A | 11/1983 | Hornby | |
| 4,520,711 A | 6/1985 | Robinson | |
| 4,606,517 A | 8/1986 | Adams | |
| 4,632,338 A | 12/1986 | Hasquenoph et al. | |
| 4,669,356 A | 6/1987 | Griffin et al. | |
| 4,987,820 A | 1/1991 | Gordon | |
| 5,036,466 A * | 7/1991 | Fitzgerald | B64D 7/00 235/400 |
| 5,092,774 A | 3/1992 | Milan | |
| 5,583,312 A * | 12/1996 | Jakubowski, Jr. | B64D 1/06 244/137.4 |
| 5,651,683 A | 7/1997 | Shimamura et al. | |
| 5,907,118 A | 5/1999 | Jakubowski, Jr. et al. | |
| 6,250,195 B1 * | 6/2001 | Mendoza | B64D 7/08 244/137.4 |
| 6,466,044 B1 | 10/2002 | Smith | |
| 6,481,669 B1 * | 11/2002 | Griffin | B64D 1/04 244/137.4 |
| 6,679,154 B1 | 1/2004 | Paul | |
| 6,705,571 B2 * | 3/2004 | Shay | B64D 1/08 244/137.1 |
| 6,811,123 B1 * | 11/2004 | Foster | F15B 1/024 244/137.4 |
| 6,851,647 B1 | 2/2005 | Rosenbaum et al. | |
| 6,948,685 B2 * | 9/2005 | Hawthorne | E05B 47/0002 244/129.1 |
| 7,059,882 B2 | 6/2006 | Sugita et al. | |
| 7,232,092 B2 | 6/2007 | Yamamoto | |
| 7,648,104 B1 * | 1/2010 | Jakubowski, Jr. | B64D 1/04 244/137.4 |
| 2002/0088902 A1 * | 7/2002 | Griffin | B64D 1/04 244/137.4 |
| 2005/0183570 A1 * | 8/2005 | McMahon | F41G 7/007 89/1.811 |
| 2006/0108478 A1 * | 5/2006 | Bajuyo | B64D 1/04 244/137.4 |
| 2007/0025809 A1 | 2/2007 | Lee et al. | |
| 2008/0203220 A1 * | 8/2008 | Hanzlick | B64F 1/10 244/63 |
| 2008/0270664 A1 | 10/2008 | Carnevali | |
| 2010/0070674 A1 * | 3/2010 | Campbell | B64D 1/04 710/315 |
| 2012/0108094 A1 | 5/2012 | Murphy et al. | |
| 2014/0048654 A1 * | 2/2014 | Williamson | B64D 1/04 244/137.4 |

* cited by examiner

AIRCRAFT STORE DEPLOYMENT SYSTEM WITH IMPROVED SAFETY OF ARMING AND RELEASING STORES

RELATED APPLICATIONS

This disclosure claims the benefit of U.S. Provisional Application No. 62/052,292 filed Sep. 18, 2014, which is hereby incorporated herein by reference in its entirety.

FIELD OF THE INVENTION

The invention relates generally to deployment systems for deploying a store, for example a munition, from a vehicle such as an aircraft.

DESCRIPTION OF THE RELATED ART

Deployment systems, such as munition racks, are used to carry and deploy stores from vehicles, and often from air vehicles, also herein referred to as aircraft. Stores, such as munitions, for instance bombs, missiles, smart bombs, or other projectiles, are loaded onto the deployment system when the aircraft is on the ground and are released when the aircraft is in the air. The deployment system is at least partially unlocked when a munition is being loaded to enable the loading of the munition, and the system is fully locked prior to takeoff of the aircraft to secure the store relative to the deployment system. A typical deployment system is then at least partially unlocked upon receipt of a master arm command from a pilot of the aircraft and further unlocked, such as fully unlocked, upon receipt of a release or fire command from the pilot, thereby allowing release of the store from the deployment system.

SUMMARY OF THE INVENTION

A deployment system for deploying a store from an aircraft includes a lock member that selectively secures the store to the deployment system, an ejector that selectively ejects the store from the deployment system, and a deployment system controller communicatively coupled to the lock member and to the ejector, the system controller communicatively coupled to the aircraft to receive commands from the aircraft, wherein upon receipt of a master arm command from the aircraft the system controller maintains the lock member in an engaged state relative to the store, and wherein upon receipt of a fire command from the aircraft the system controller disengages the lock member from the store and activates the ejector to eject the store from the deployment system.

The deployment system may include a sub-control assembly coupled to the lock member and to the ejector to control movement of the lock member and/or the ejector. The sub-control assembly has a first position to disengage the lock member from the store and to maintain de-actuation of the ejector. The sub-control assembly also has a second position both to disengage the lock member from the store and to activate the ejector, wherein the sub-control assembly is movable between the first and second positions.

The deployment system also includes a lock actuator that selectively moves the lock member into disengagement from the store, a power channel that couples the lock actuator to a power source to activate the lock actuator, and a sub-lock that couples to the lock member to selectively prevent movement of the lock member relative to the store. The sub-control assembly is coupled to the sub-lock to selectively control alignment of the sub-lock relative to the lock member to allow movement of the lock member relative to the store. The sub-control assembly is also coupled to the power channel to selectively control actuation of the lock actuator. The sub-control assembly is further coupled to the lock actuator to control movement of the lock actuator.

In the safe position, the sub-control assembly prevents movement of the lock actuator via the coupling of the lock actuator to the sub-control assembly to prevent power from moving through the power channel to activate the lock actuator and the ejector. In the safe position, the sub-control assembly also prevents movement of the lock member via the coupling of the sub-lock to the sub-control assembly to maintain securement of the store to the deployment system.

In the ground position, the sub-control assembly prevents movement of the lock actuator via the coupling of the lock actuator to the sub-control assembly to prevent power from moving through the power channel to activate the lock actuator and the ejector. In the ground position, the sub-control assembly also at least partially uncouples the sub-lock from the lock member to allow movement of the lock member via a manual release.

In the fire position, the sub-control assembly partially uncouples from the lock actuator to allow movement of the lock actuator to allow power to move through the power channel to activate the lock actuator and the ejector. In the fire position, the sub-control assembly also at least partially uncouples the sub-lock from the lock member to allow movement of the lock member via the lock actuator to allow disengagement of the lock member from the store.

The deployment system further includes a release member coupled to the sub-control assembly and selectively opening the power channel to the environment, wherein the sub-control assembly selectively prevents power flow through the power channel by opening the release member to allow power to flow from the power source to the environment, and wherein the sub-control assembly selectively allows power to flow through the power channel by closing the release member to allow power to flow from the power source to the lock actuator and to the ejector.

The deployment system additionally includes a power valve disposed between the power channel and the power source, where the power valve controls flow of power into the power channel from the power source, and a power valve interrupt that selectively provides actuation power to the power valve allowing the power valve to open to allow flow of power from the power source into the power channel, where the power valve is coupled to the system controller via the power valve interrupt.

According to one aspect, a deployment system for deploying a store from an aircraft includes a lock member that selectively secures the store to the deployment system, an ejector that selectively ejects the store from the deployment system, and a deployment system controller communicatively coupled to the lock member and to the ejector, wherein the system controller is communicatively coupled to the aircraft to receive commands from the aircraft. Upon receipt of a master arm command from the aircraft the system controller maintains the lock member secured to the store, and upon receipt of a fire command from the aircraft, the system controller disengages the lock member from the store and actuates the ejector to eject the store from the deployment system.

The deployment may further include a lock actuator that selectively moves the lock member between a primary position where the lock member is engaged with the store and a secondary position where the lock member is disengaged from the store, a sub-lock partially releasably coupled to the lock member to prevent movement of the lock member by the lock actuator, and a sub-control assembly coupled to the sub-lock. The sub-control assembly selectively moves the sub-lock between a primary position and a secondary position, where in the primary position the sub-lock is fully coupled with the lock member and prevents movement of the lock member by the lock actuator, and where in the secondary position the sub-lock is partially decoupled from the lock member and allows movement of the lock member by the lock actuator.

The deployment system may further include a sub-control assembly coupled to the lock member and to the ejector, where the sub-control assembly moves between a first position to disengage the lock member from the store and to maintain de-actuation of the ejector, and a second position to disengage the lock member from the store and to activate the ejector.

The deployment system may further include a lock actuator that selectively moves the lock member into disengagement from the store, a power channel that couples the lock actuator to a power source supplying power to activate the lock actuator, and a sub-control assembly that couples to the lock member to selectively control movement of the lock member and to the power channel to selectively control actuation of the lock actuator.

The sub-control assembly may be coupled to the lock actuator to prevent movement of the lock actuator.

The deployment system may further include a power channel that couples the ejector to a power source supplying power to activate the ejector, and a release member coupled to the ejector. Selective movement of the release member controls flow of power through the power channel and to the ejector. The release member moves between a default open position allowing power to escape the power channel and to bypass the ejector, and a secondary closed position allowing power to actuate the ejector.

The deployment system may further include a biasing member coupled to the release member that biases the release member in the default open position.

According to another aspect, a deployment system for deploying a store from an aircraft may include a lock member that selectively secures the store to the deployment system, a lock actuator that selectively moves the lock member between a primary position where the lock member is engaged with the store and a secondary position where the lock member is disengaged from the store, an ejector that ejects the store away from the deployment system, and a release member that selectively moves between a primary position that prevents actuation of the ejector and of the lock actuator and a secondary position that allows actuation of the ejector and of the lock actuator.

The deployment system may further include a sub-control assembly that selectively moves the release member between its default and secondary positions, and that selectively engages the lock actuator to prevent movement of the lock actuator.

The deployment system may further include a biasing member that biases the release member in the primary position.

The lock actuator may be a pneumatic cylinder.

The biasing member may be a spring or a solenoid.

The deployment system may further include a sub-lock partially releasably coupled to the lock member, wherein partial disengagement of the sub-lock from the lock member selectively allows the lock actuator to move the lock member between its default and secondary positions.

The deployment system may further include a manual release coupled to the lock member to move the lock member from its primary position to its secondary position while maintaining the release member in its secondary position.

According to yet another aspect, included is a method of operating a deployment system of an aircraft to release a store from the deployment system, the deployment system including a lock member to selectively engage the store to secure the store to the deployment system, a sub-lock partially releasably coupled to the lock member to selectively engage the lock member to control movement of the lock member, an ejector to selectively eject the store from the deployment system, and a sub-control assembly coupled to each of the lock member, the sub-lock, and the ejector to selectively move each of the lock member, the sub-lock, and the ejector to selectively release and eject the store from the deployment system. The method includes manually moving the sub-control assembly to a ground position to partially disengage the sub-lock from the lock member to allow movement of the lock member, and thereafter manually moving the lock member to a secondary position disengaged from a default locked position to load a store to the deployment system while the aircraft is grounded. The method also includes after loading of a store, manually moving the sub-control assembly to a safe position to fully re-engage the sub-lock with lock member to prevent movement of the lock member in preparation for takeoff of the aircraft. The method further includes after moving the sub-control assembly to its safe position, maintaining the sub-control assembly in its safe position to prevent unlocking of the lock member and actuation of the ejector upon receipt of a master arm command from a pilot interface communicatively coupled to the deployment system.

The method may further include automatically moving the sub-control assembly to a fire position to partially disengage the sub-lock from the lock member to allow movement of the lock member, to move the lock member to a secondary position disengaged from the store, and to actuate the ejector to eject the store upon receipt of a fire command from the pilot interface communicatively coupled to the deployment system.

The method may further include moving the sub-control assembly to a safe position from the fire position to prevent actuation of the ejector upon detection of a failed release of the store from the lock member or ejection of the store by the ejector.

The method may further include preventing actuation of the ejector via the sub-control assembly when the sub-control assembly is manually moved to its ground position.

The method may further include closing a release member of the deployment system via the sub-control assembly when the sub-control assembly is moved to its fire position to allow actuation power to flow to the ejector to eject the store, and opening the release member via the sub-control assembly when the sub-control assembly is moved to its safe position to prevent actuation power from flowing to the ejector to prevent ejection of the store.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the disclosure.

DETAILED DESCRIPTION

A deployment system, such as a munitions deployment system, is configured for carrying and releasing a store, such as a munition from an aircraft. The deployment system may include mechanical, electrical, and/or pneumatic components for selectively securing a store, such as a munition, to the deployment system and for selectively releasing and/or ejecting the store from the deployment system. The munition may be a missile, bomb, smart bomb, supply container, etc. The aircraft carrying the deployment system may be any suitable plane, drone, helicopter, etc. The aircraft and deployment system may be used for militaristic or domestic purposes.

The deployment system provides redundant checks for securing a store to the deployment system while the aircraft is grounded, taking off, flying, etc. The deployment system selectively locks or disengages release and ejection components while the deployment system is in a ground state and a store is being loaded onto and/or unloaded from the deployment system to prevent accidental release and/or ejection of the store. Likewise, the store is selectively secured to the deployment system and is prevented from being released in a safe state until such time that release is necessary when the deployment system switches to a fire state. The deployment system is capable of switching to the safe state while the aircraft is taking-off and/or flying, or in the case of a fault condition detected during the release of the store from the deployment system.

Figure 1:
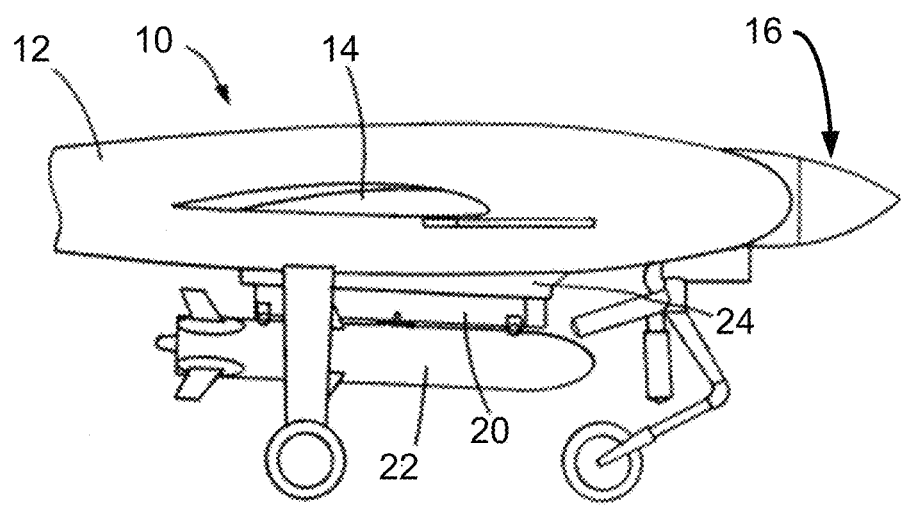
FIG. 1 is a side view of an aircraft carrying a deployment system in accordance with the invention.

Turning now to FIG. 1, an aircraft 10 is illustrated. The aircraft 10 may be an unmanned aerial vehicle (UAV), a drone aircraft used for surveillance and/or targets. Alternatively, the aircraft 10 may be a fighter aircraft, bomber aircraft, cargo plane, helicopter, etc. The aircraft 10 may have conventional aircraft features, such as a fuselage 12, wings or other lift-producing surfaces 14, control surfaces, guidance systems 16, communication systems, and the like.

A deployment system 20 is used to deploy a store 22 from the aircraft 10. In the illustrated embodiment the deployment system 20 is secured to a wing spar 24 of the aircraft 10, although alternatively the deployment system 20 may be secured to any other suitable part of the aircraft 10, such as to the underside of the fuselage 12 or in a bay contained within the fuselage 12. The deployment system 20 provides a releasable mechanical securement of the store 22 to the aircraft 10. This allows the store 22 to be selectively deployed at a desired time during flight of the aircraft 10. In addition to providing releasable mechanical securement of the store 22, the deployment system 20 may also provide an electrical, communicative and/or pneumatic coupling between the aircraft 10 and the deployment system 20, as will be described in greater detail.

The store 22 may be configured to receive any of a variety of small payloads, with "small payloads" being defined as a payload with a mass of 45 kg or less (a weight of 100 lbs or less), or large payloads, with "large payloads" being defined as a payload with a mass of 46 kg or more (a weight of 101 lbs or more). Alternatively, the payload may have a mass of 23 kg or less (a weight of 50 lbs or less), or a mass of 11 kg or less (a weight of 25 lbs or less). The store 22 may alternatively be any of a variety of other types of stores, for example sonar buoys, weather measurement stores, supply containers, and/or other types of equipment and/or supplies.

Figure 2:
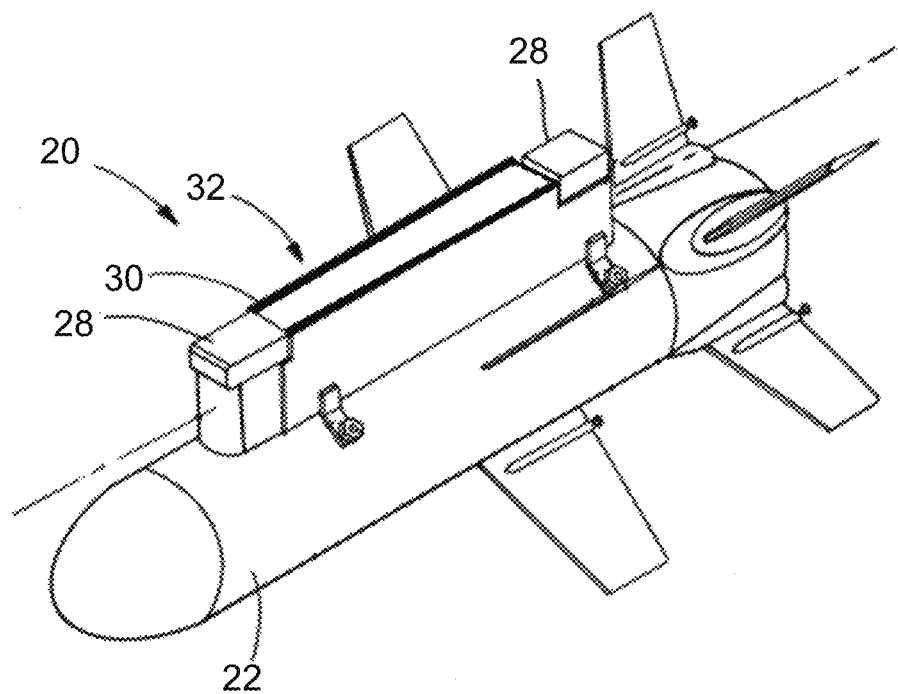
FIG. 2 is an isometric view of the deployment system and the store to be deployed, as part of the embodiment of FIG. 1.

FIG. 2 shows further details of the engagement between the deployment system 20 and the store 22 that is deployed. The deployment system 20 may be secured to the aircraft 10 (FIG. 1) using mounting blocks 28 or the like. The deployment system 20 has a housing 30 that includes within it a mechanism 32, described in detail below, for holding and releasing the store 22.

The mechanism 32 has a locking portion for selectively releasably securing the store 22 to the deployment system 20, and an ejection portion for selectively ejecting the store 22 from the deployment system 20. In addition, the deployment system 20 may have an actuation portion, such as a pneumatic actuation portion, for activating one or more of the locking portion and/or the ejection portion. The mechanism 32 may include a sub-control assembly for coupling to and controlling the locking portion, ejection portion, and/or actuation portion, thereby placing the mechanism 32 into any of a set of states of the mechanism. As used herein, coupling may include direct coupling or indirect coupling.

The states of the mechanism 32 may include a ground state for loading and unloading a store 22, such as a munition, from the deployment system 20. The mechanism 32 may also have a fire state for the release and ejection of the store 22. A safe state may be used for take-off and/or flight of the aircraft 10, in addition to the mechanism 32 defaulting to the safe state in the case of a fault condition being detected during the release of the store 22. A fault condition may include a hung store, partially hung store, non-releasing locking portion, or other malfunctioning component.

Turning to FIGS. 3-7, another deployment system is illustrated at 50 for deploying a store from an aircraft and which may be used in place of the deployment system 20 of FIGS. 1 and 2. Components and/or features of either of the deployment systems 20 and 50 may be used with the other of the deployment systems 20 and 50. As illustrated, the deployment system 50 includes all of the features of the deployment system 20 except for as herein described and in addition to the features of the deployment system 50 herein described.

Figure 3:
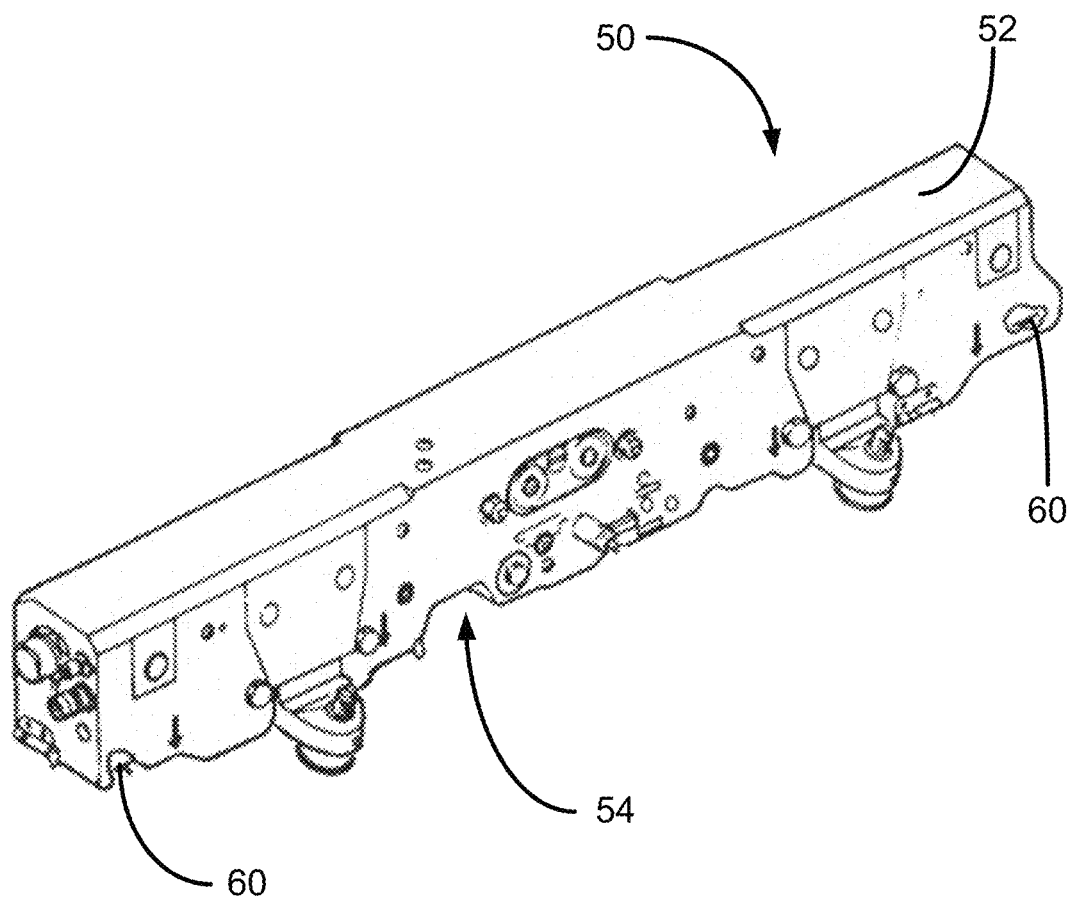
FIG. 3 is an isometric view of a deployment system, in accordance with the invention.
Figure 4:
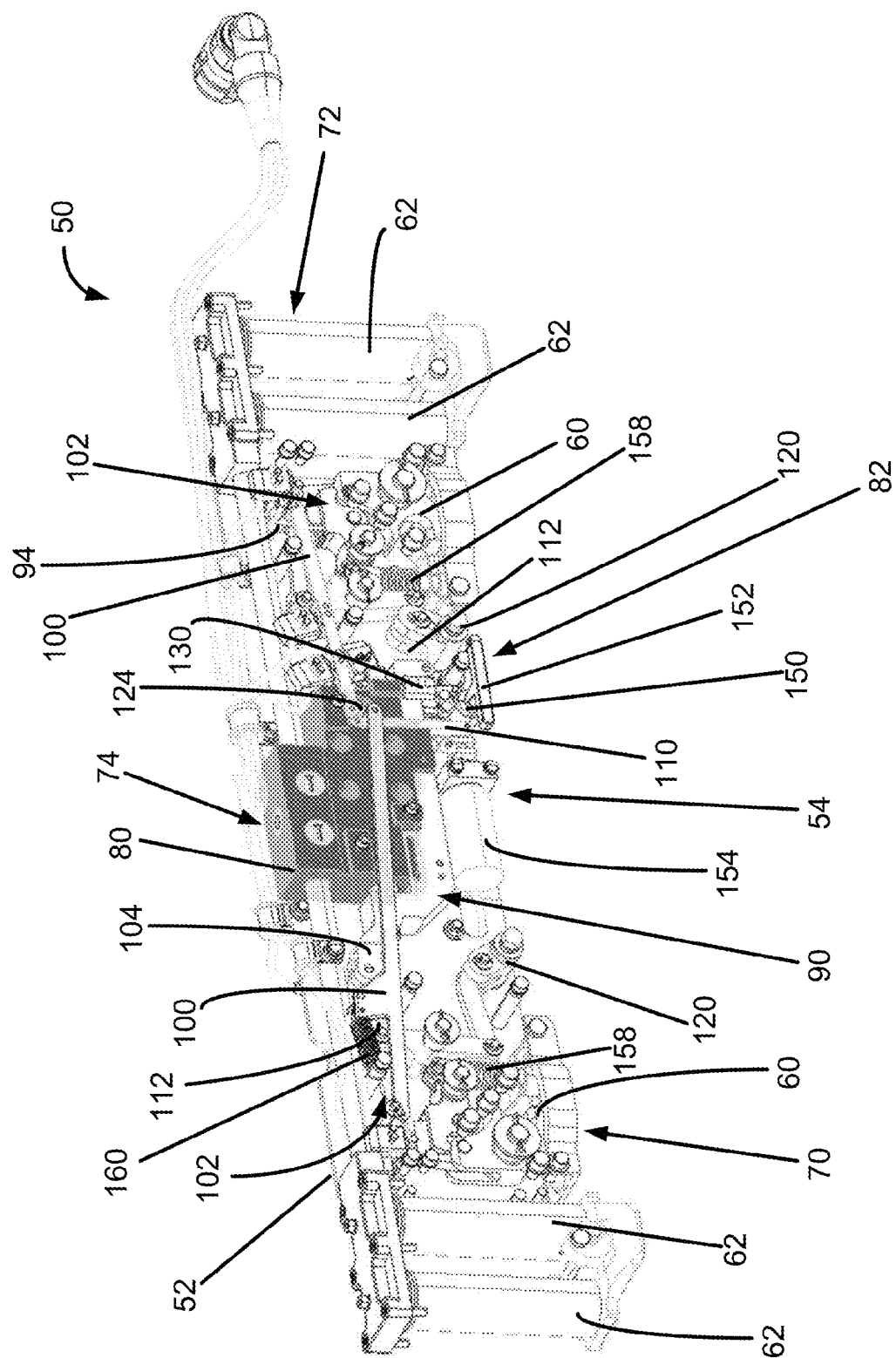
FIG. 4 is a partial cross-sectional, isometric view of the deployment system of FIG. 3.
Figure 5:
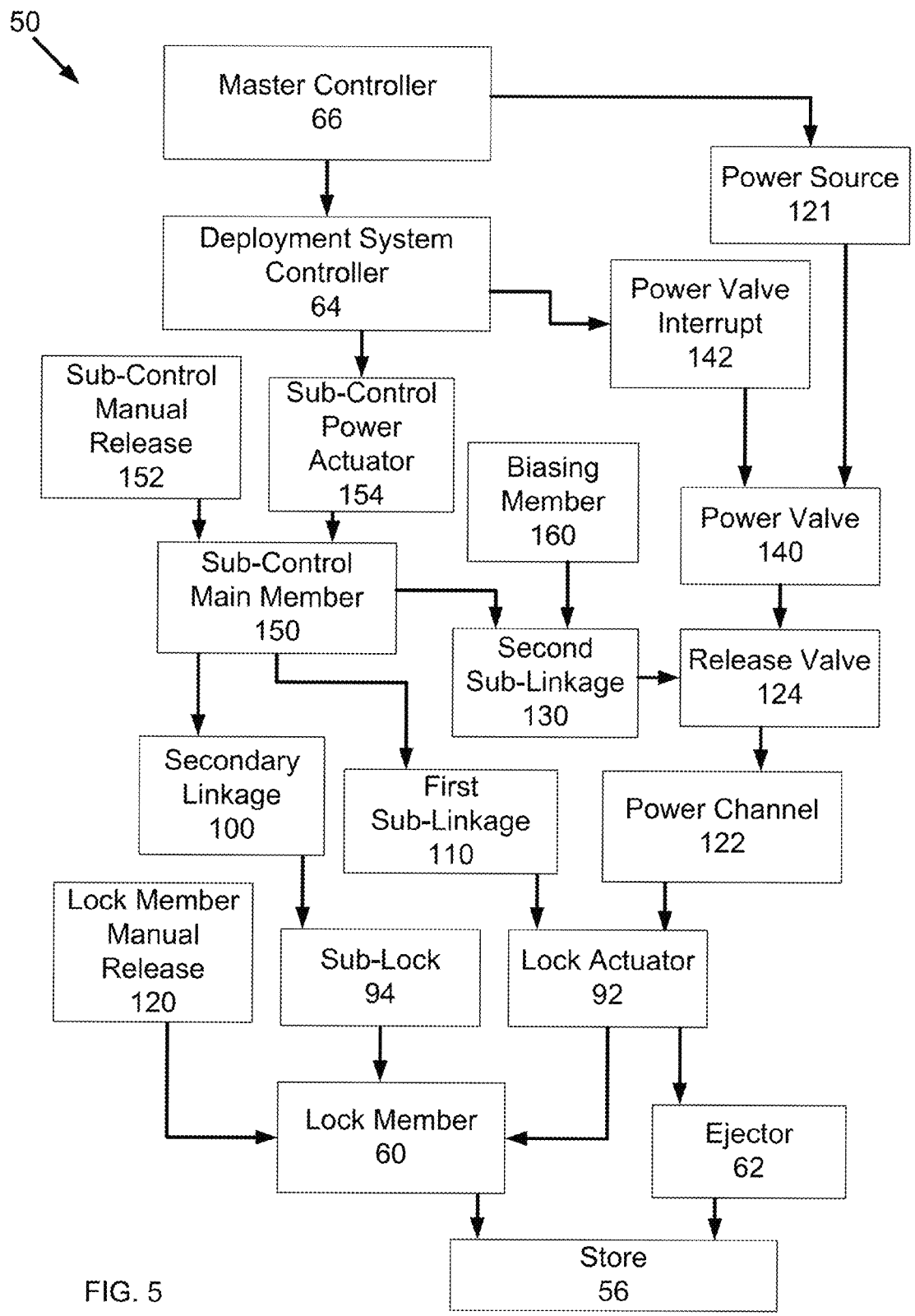
FIG. 5 is a schematic representation of the deployment system of FIG. 3.
Figure 6:
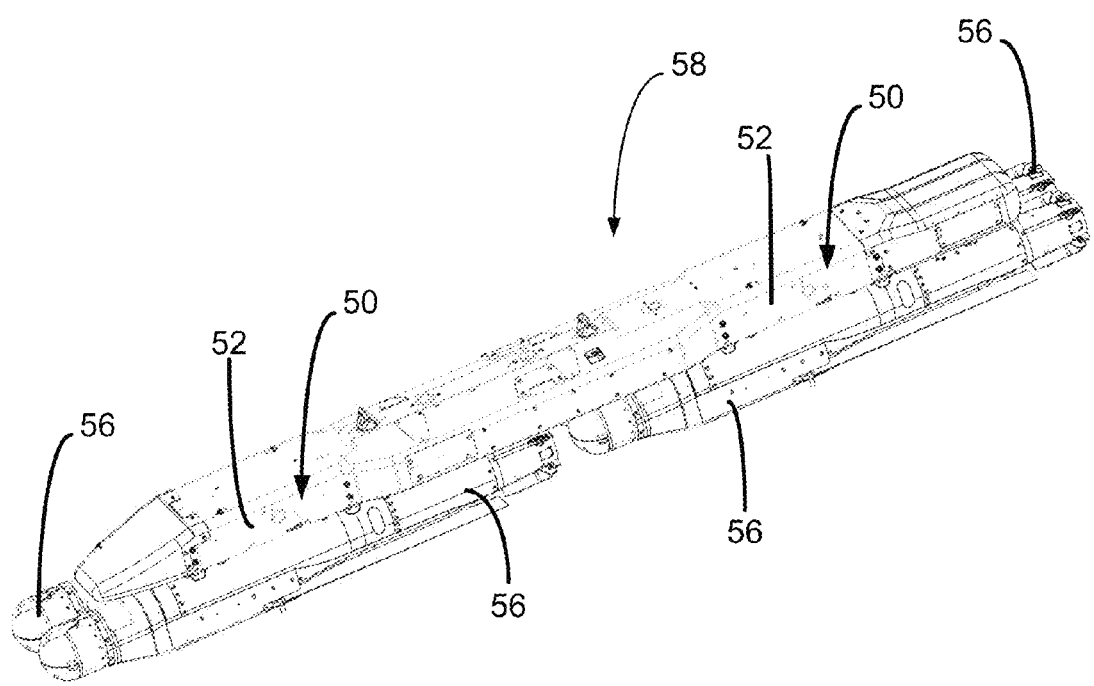
FIG. 6 is an isometric view of a release unit including the deployment system of FIG. 3.
Figure 7:
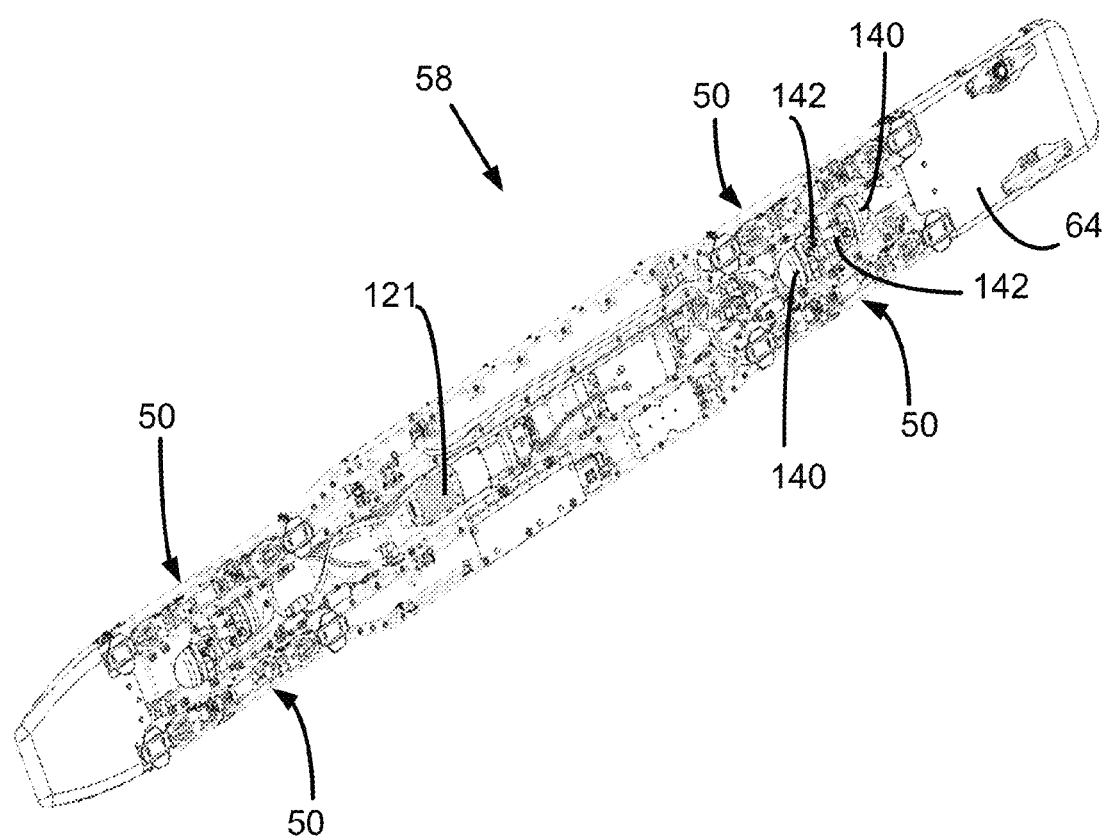
FIG. 7 is a partial cross-sectional, isometric view of the release unit of FIG. 6.

Note that FIG. 5 is a schematic representation of the deployment system 50 of FIGS. 3 and 4. For purposes of simplicity of explanation, the components are shown as a series of blocks in FIG. 5. The functioning of the deployment system 50 is not limited by the order of the blocks, as some blocks can occur in different orders or concurrently with other blocks from that shown or described, such as in parallel or in series with other blocks. Moreover, less than all the illustrated component-representing blocks may be required to implement an example deployment system. Furthermore, additional or alternative deployment systems according to the invention can employ additional, non-illustrated component-representing blocks. Additionally, couplings between blocks may be any suitable type of suitable couplings, such as mechanical, electrical, fluid, fluidic, electro-mechanical, and/or communicative couplings.

Similar to the deployment system 20 (FIGS. 1 and 2), the deployment system 50 includes a housing 52 having a mechanism 54 at least partially disposed therein. The housing 52 is adapted to be coupled to an aircraft (not shown). The mechanism 54 is adapted to hold and release a store 56 (FIG. 5), such as a munition. The store 56 may be any suitable store as explained with reference to the store 22 of FIGS. 1 and 2.

The deployment system 50 may be included in a release unit 58 (FIGS. 6 and 7) for securing and releasing multiple stores 56. The illustrated release unit 58 is configured to be secured to an aircraft, as with the deployment system 20 (FIGS. 1 and 2). The release unit 58 includes four deployment systems 50 for releasing four stores 56, although any suitable number of deployment systems and stores may be included.

The deployment system 50 includes a lock member 60 selectively engaging the store 56 to the deployment system 50, an ejector 62 that selectively ejects the store 56 from the deployment system 50, and a system controller 64 (FIG. 7) communicatively coupled to the lock member 60 and to the ejector 62. The system controller 64 is communicatively coupled to a master controller 66 (FIG. 5) of the aircraft for receiving commands from the aircraft. At different stages of flight, the system controller 64 may activate the lock member 60 and/or the ejector 62 to unsecure and eject the store 56 from the aircraft.

The commands may be communicated to the master controller 66 from the cockpit, from an external source, or the master controller 66 may be programmed to self-initiate such commands, for example. Exemplary commands may include a master arm command and a fire arm command, which may be issued in succession.

In typical deployment systems, the master arm command often is issued to ready the deployment system for firing of the store and typically includes activating one or more actuators to disengage a locking portion of a deployment system from the store. In such case, the aircraft may continue to fly towards a target area for a significant portion of time. During this time, the actuators continue to be activated, producing substantial heat and requiring substantial power. Additionally, substantially-sized actuators may have a large physical footprint which may be required to maintain disengagement of the respective locking portion. After a substantial period of time, the fire command may be issued causing ejection of the respective store from the deployment system.

Referring to the deployment system 50, the system controller 64 is configured to similarly receive the typical master arm and fire commands. The deployment system 50 may be used in conjunction with legacy aircraft where the legacy aircraft are adapted, such as wired, for sending separate master arm and fire commands. Though upon receipt of the master arm command from the master controller of the aircraft, the system controller 64 is configured to maintain the lock member 60 in an engaged position relative to the store 56 and also to maintain the ejector 62 in an inactivated state. Subsequently, upon receipt of the fire command from the master controller 66, the system controller 64 is configured to disengage the lock member 60 from the store 56 and to activate the ejector 62 to eject the store 56 from the deployment system 50.

Upon receipt of the prior master arm command, the system controller 64 may send a return communication to the master controller 66 merely indicating that the master arm command has been received. The communication may be displayed as a signal light, as an on screen message, or the like. Alternatively, the system controller 64 may receive the master arm command and may not send a return communication to the master controller 66. In one embodiment, the system controller 64 may be configured to switch deployment system electrical or computer components from a "sleep" state to a "ready" state.

Between issuance of the master arm command and the fire command, the aircraft may continue to fly towards a target destination or target area with the deployment system 50 in substantially safer state. For example, ejection of the store 56 due to accidental actuation of the ejector 62 will be prevented via continued securement of the store 56 to the deployment system 50 via the lock member 60. Further, an actuator for activating the lock member 60 at time of receipt of the fire command may be configured for a shorter period of actuation. Thus the actuator may have a relatively small physical footprint, require a relatively small amount of power, and/or produce a relatively small heat signature.

To maintain securement of the store upon receipt of the master arm command and to execute the fire command, the mechanism 54 of the deployment system 50 includes numerous additional components. As shown in the partial cross-sectional view of FIG. 4, the mechanism 54 includes a locking portion 70 having the lock member 60 and an ejection portion 72 having the ejector 62. An actuation portion 74 for activating one or more of the locking portion 70 and/or the ejection portion 72 includes a pneumatic actuation manifold 80. In other embodiments the actuation portion 74 may include one or more electrical relays and/or one or more electrical, mechanical, or electro-mechanical actuators, for example. Further, the mechanism 54 may include a sub-control assembly 82 coupled to each of the locking portion 70, the ejection portion 72, and the actuation portion 74. The sub-control assembly 82 may control one or more of these portions, thereby placing the mechanism 54 into any of a ground, safe, or fire state of the mechanism 54, to be explained in detail.

The sub-control assembly 82 is communicatively coupled to the system controller 64 and is adapted to place the mechanism 54 into different states upon receipt of one or more commands from the system controller 64. In a ground state, the sub-control assembly 82 is positionable in a ground position to disengage the lock member 60 from the store 56 and maintain de-actuation of the ejector 62. In a fire state, the sub-control assembly 82 is positionable in a fire position to both disengage the lock member 60 from the store and to activate the ejector 62.

As will be explained, the sub-control assembly 82 affects each of the inter-coupled locking portion 70, ejection portion 72, and actuation portion 74. The locking portion 70 includes the lock member 60, which is shown as a hook member, though the lock member 60 may have any suitable shape for latching to and securing the store 56 to the deployment system 50. The lock member 60 moves from a primary position engaged with the store 56 to a secondary position disengaged from the store 56. The store 56 may have a corresponding latch member for engaging with the lock member 60. As shown, the mechanism 54 includes two oppositely disposed lock members 60, although any suitable number of lock members 60 may be used. The lock member 60 is coupled to the sub-control assembly 82 by one or more main linkages 90.

Interdisposed between the sub-control assembly 82 and the main linkages 90 is a lock actuator 92. In the depicted embodiment the lock actuator 92 is coupled to the main linkages 90. The lock actuator 92 is controlled by the actuation portion 74, which is in turn controlled by the sub-control assembly 82, to be discussed in detail. As shown, the lock actuator 92 is a movable member, such as a linearly movable piston, although in other embodiments the lock actuator 92 could be any other suitable linearly movable member or any other suitable type of linear actuator, such as a travelling-nut linear actuator. Actuation of the lock actuator 92 causes the lock actuator 92 to extend from the manifold 80, moving the main linkages 90, and in turn moving the lock member 60 into disengagement from the store 56, which is also the position for receiving a latch member of the store 56 during loading. Thus the lock actuator 92 moves the lock member 60 from the primary position engaged with the store 56 to the secondary position disengaged from the store 56.

A sub-lock 94 is coupled to the lock member 60 via coupling to one or more main linkages 90. The coupling between the lock member 60 and the sub-lock 94 is a partially releasable coupling. The sub-lock 94 is coupled to the sub-control assembly 82 for being moved by the sub-control assembly 82. The sub-lock 94 moves between a primary position and a secondary position. In the primary position, the sub-lock 94 is fully engaged with the main linkages 90 and prevents movement of the main linkages 90, in turn preventing disengagement of the lock member 60 from the store 56, and maintaining the lock member 60 in its primary position securing the store to the deployment system 50. In the secondary position, the sub-lock 94 is unlocked from the main linkages 90, also herein referred to as only partially engaged with the main linkages 90, and allows movement of the main linkages 90, in turn allowing disengagement of the lock member 60 from the store 56. The engagement of the sub-lock 94 with the main linkages 90 may include a key and channel arrangement, or any other suitable interlocking arrangement, wherein the interlocking arrangement is disengaged in the secondary position of the sub-lock 94.

The sub-lock 94 is coupled to the sub-control assembly 82 via a secondary linkage 100. Movement of the sub-control assembly 82 may cause movement of the secondary linkage 100, depending on the alignment/position of the sub-control assembly 82, thus moving the sub-lock 94 between its default and secondary positions.

For example, a first sub-linkage 110 of the sub-control assembly 82 is coupled between a sub-control main member 150 and the secondary linkage 100. The first sub-linkage 110 and secondary linkage 100 are coupled, preferably rotatably coupled, relative to one another via a coupling member 111, which is depicted as a rotatable member coupled to the manifold 80.

The first sub-linkage 110 may be moved from a first position to a second position allowing movement of the sub-lock 94 from its primary position to its secondary position, to unlock the sub-lock 94, thus allowing movement of a first portion 102 of the main linkages, to be discussed further. In this second position of the first sub-linkage 110, an engagement portion 109 (FIG. 11) of the first sub-linkage 110 may remain securely engaged to a second portion 104 of the main linkages 90. The engagement portion 109 may include part of a key and channel, groove and pinion, etc.

The first sub-linkage 110 may be further moved from the second position to a third position, disengaging the first sub-linkage 110 from the second portion 104. In this third position, the unlocked second portion 104 may be moved by the lock actuator 92. Though in the case that the first portion 102 has already been moved to disengage the lock member 60 into its secondary position, movement of the second portion 104 will not have additional substantial effect on the first portion 102.

Referring now again to the position of the sub-lock 94, when in its secondary position, the unlocked sub-lock 94 enables movement of only the first portion 102 of the main linkages 90, thereby allowing disengagement of the lock member 60 from the store 56. The first portion 102 of the main linkages 90 is coupled to the second portion 104 of the main linkages 90 at least partially by the sub-lock 94. When the sub-lock 94 is unlocked in its secondary position, the second portion 104 of the main linkages 90 may remain locked from movement by the first sub-linkage 110 in its second position, thus preventing actuation of the lock actuator 92.

To summarize, the sub-lock 94 functions in conjunction with the first sub-linkage 110 coupled to the second portion 104 of the main linkages 90. Unlocking of the sub-lock 94 enables the lock actuator 92 to move both the first and second portions 102 and 104 of the main linkages 90, when the main linkages 90 are not locked by the first sub-linkage 110 (i.e., when the first sub-linkage 110 is in its third position).

On the other hand, when the sub-lock 94 is unlocked via the sub-control assembly 82 and the second portion 104 is instead locked via the first sub-linkage 110 of the sub-control assembly 82 (i.e., when the first sub-linkage 110 is in its second position), the second portion 104 of the main linkages 90 cannot be moved by the lock actuator 92. In this case the first portion 102 remains coupled to the second portion 104 via a transition linkage 112, though the first portion 102 can move separately from the second portion 104.

In the depicted embodiment, the first portion 102 and the second portion 104 may move separately from one another, yet still move in conjunction with one another when the sub-lock 94 is unlocked, via the transition linkage 112. In one embodiment, the transition linkage 112 and the second portion 104 may include a slot and key arrangement. When the second portion 104 is movable, a key of the second portion 104 may engage a slot of the transition linkage 112, moving the transition linkage 112 and the remainder of the first portion 102. On the other hand, when the second portion 104 is locked via the first sub-linkage 110, the slot of the transition linkage 112 may move relative to the stationary key of the second portion 104, allowing for movement of the first portion 102 separate from the second portion 104. The slot is configured, such as suitably sized, to allow for this separate movement. In other embodiments any other suitable arrangement between the first and second portions 102 and 104 may be used to enable the separate and joint movements of the first and second portions 102 and 104.

The first portion 102 may be caused to move separately from and relative to the second portion 104 of the main linkages 90 via mechanical coupling of the first portion 102 to a lock member manual release 120. The lock member manual release 120 may be activated via a suitable tool, such as a wrench, to move the lock member 60 to its secondary position while maintaining locking of the second portion 104 of the main linkages 90, via coupling of the first sub-linkage 110 to the main linkages 90, to prevent actuation of the lock actuator 92.

In the depicted embodiment, preventing actuation of the lock actuator 92 also prevents actuation of the ejector 62 by controlling flow of power through the pneumatic actuation manifold 80. As illustrated, the power used is pressure supplied to the actuation manifold 80 from a power source 121 (FIGS. 5 and 7), such as a compressor of the aircraft. The compressor may move air and/or any other suitable gas through a pneumatic system of the aircraft. In other embodiments the manifold 80 may be a hydraulic actuation manifold and the aircraft may have a motor or pump for moving suitable hydraulic fluid to the manifold for actuating a lock actuator and an ejector, which may be hydraulically actuators.

Figure 11:
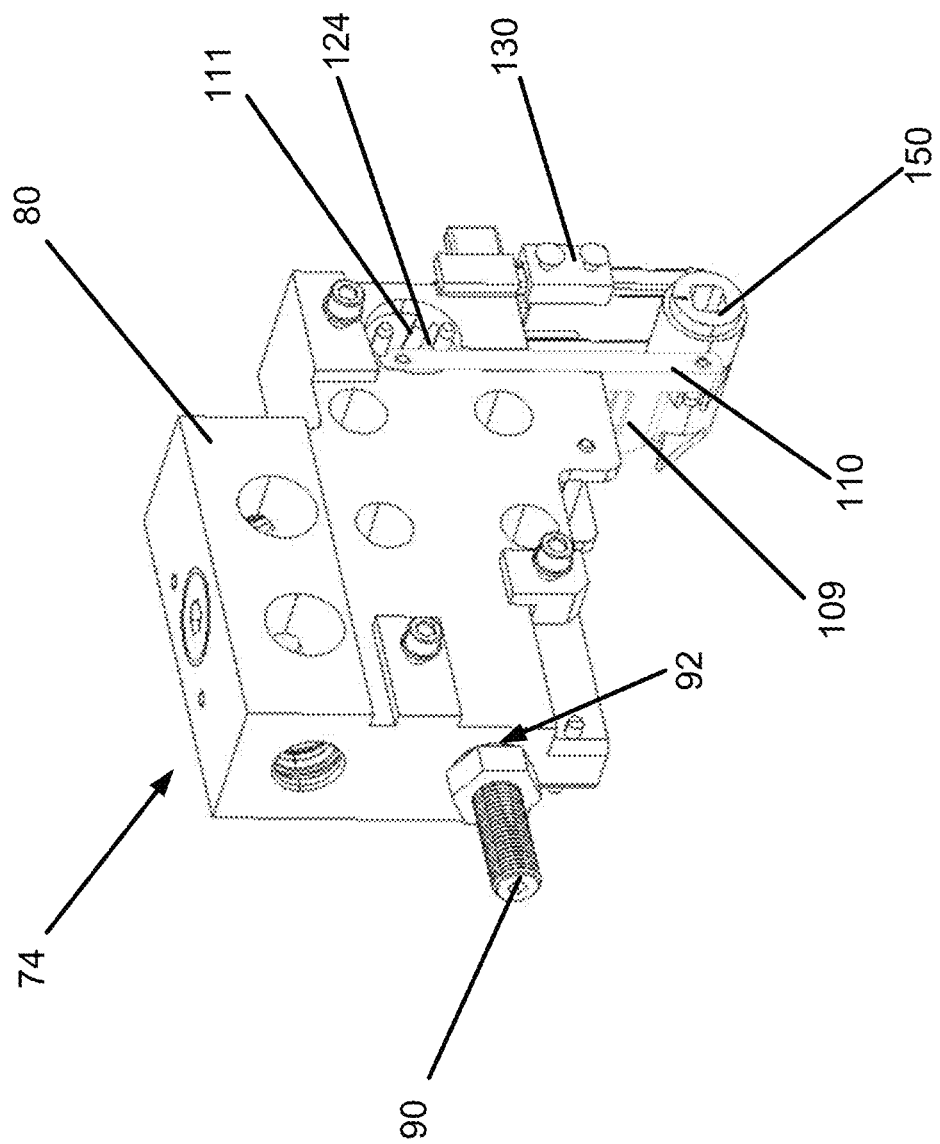
FIG. 11 is an isometric view of a portion of the deployment system of FIG. 3.
Figure 12:
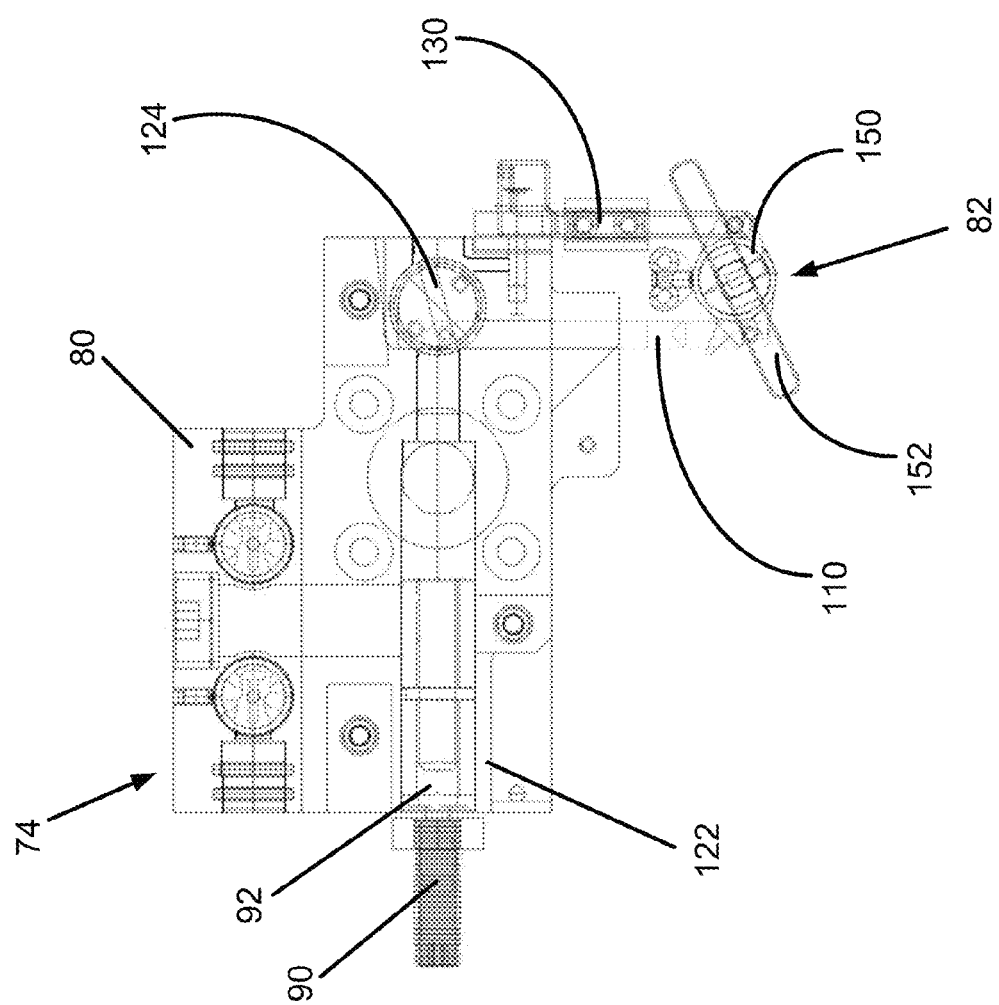
FIG. 12 is a partial cross-sectional, side view of a portion of the deployment system of FIG. 3.

In the case of the pneumatic pressure manifold 80, which is shown in detail in FIGS. 11 and 12, pressure supplied to the manifold 80 moves through a power channel 122 (FIGS. 11 and 12) of the manifold 80 towards each of the lock actuator 92 and the ejector 62. In the depicted embodiment, the power channel 122 is partially blocked by the inactivated lock actuator 92. Thus the lock actuator 92 must be allowed to activate prior to pressure moving past the lock actuator 92 through the power channel 122 towards the ejector 62. In another embodiment, the manifold 80 may include a pressure valve which does not open until sufficient pressure builds in the power channel 122, thus allowing the lock actuator 92 to actuate prior to actuation of the ejector 62.

As shown, the deployment system 50 includes two pairs of ejectors 62. A pair of ejectors 62 is oppositely disposed at opposite ends of the housing 52 for engaging opposite ends of the store 56. In this manner the store 56 may be ejected away from the deployment system 50 and away from the aircraft to reduce the chance that the store 56 is affected by air drag acting on the aircraft. The ejectors 62 are depicted as pneumatic actuators which release upon build-up of a sufficient amount of pressure in the manifold 80. In other embodiments, any suitable number or type of ejectors 62 may be used.

In addition to the manifold 80 and the ejectors 62, the actuation portion 74 includes a release member, such as a release valve 124, coupled to the power channel 122. The release valve 124 provides a path for pressure to escape the manifold 80 and move into the external environment, therefore preventing the lock actuator 92 and the ejector 62 from activating until the release valve 124 is closed. The release valve 124 may be suitable type of valve such as a rotary vent valve, purge valve, etc.

In the illustrated embodiment of FIG. 5, the release valve 124 is disposed coupled to the power channel 122 at an end opposite the lock actuator 92. The release valve 124 is also shown integral with the coupling member 111, which couples together the first sub-linkage 110 and secondary linkage 100. In other embodiments, the release valve 124 may be disposed in any suitable location upstream of flow of pressure to the lock actuator 92.

The release valve 124 is moved between a default open state and a secondary closed state via the sub-control assembly 82. A second sub-linkage 130 of the sub-control assembly 82 is coupled to the release valve 124 for moving the release valve 124. The second sub-linkage 130 is movably coupled to the first sub-linkage 110 and the secondary linkage 100 via the release valve 124/coupling member 111.

Accordingly, upon actuation of the compressor and receipt of pressure to the manifold 80, pressure will flow through the power channel 122 towards a default open release valve 124, preventing actuation of the lock actuator 92. Upon moving of the sub-control assembly 82 to close the release valve 124, pressure will not escape the power channel 122 to the environment and will instead act upon the lock actuator 92 to move the main linkages 90 and thus the lock member 60. This is the case as long as the first sub-linkage 110 is in its third position disengaged from the second portion 104 of the main linkages 90. On the other hand, where the sub-control assembly 82 is not also aligned to disengage the first sub-linkage 110 from the second portion 104, pressure will remain within the power channel 122 until the first sub-linkage 110 is unlocked from the main linkages 90, thereby allowing for the lock actuator 92 to be activated moving the main linkages 90.

Movement of pressure into the manifold 80 for activating the lock actuator 92 is at least partially controlled by the deployment system controller 64. While the master controller 66 controls the power source 121, the deployment system controller 64 controls flow from the power source 121 into the manifold 80. The system controller 64 is communicatively coupled to a power valve 140 (FIG. 7) to regulate flow into the power channel 122. The power valve 140 may be any suitable valve such as an open/close valve or a metering valve.

Further, a power valve interrupt 142 (FIG. 7) may be communicatively coupled between the system controller 64 and the power valve 140 to regulate flow of electrical actuation power between the controller 64 and the power valve 140. The power valve interrupt 142 may be a relay or any other suitable component for interrupting flow of electrical actuation power to the power valve 140.

The power valve interrupt 142 serves as a redundant check on the movement of pressure into the manifold 80. In one embodiment, the power valve interrupt 142 may not allow electrical power to flow to the power valve 140 to open the power valve 140 unless the interrupt 142 receives an activation code from at least one of the system controller 64 or the master controller 66. The activation code may be a rotating or randomized code such as a 16-bit or 32-bit encryption key.

The power valve interrupt 142 and power valve 140 provide for checks on the disengagement and ejection of the store 56 from the deployment system 50, in addition to the redundant controls/checks provided by the sub-control assembly 82. As previously described, the sub-control assembly 82 controls movement of (a) the release valve 124 via the second sub-linkage 130 thereby controlling movement of pressure towards the lock actuator 92 and the ejector 62. The sub-control assembly 82 also controls movement of (b) the lock actuator 92 via the first sub-linkage 110 thereby controlling movement of the main linkages 90 and movement of pressure past the lock actuator 92 towards the ejector 62. The sub-control assembly 82 further controls movement of (c) the sub-lock 94 via the secondary linkage 100 thereby controlling movement of the first portion 102 of the main linkages 90 and in turn controlling movement of the lock member 60.

Movement of the secondary linkage 100, the first sub-linkage 110, and the second sub-linkage 130 of the sub-control assembly 82 are controlled via alignment/positioning of the remainder of the sub-control assembly 82, and specifically via alignment of a sub-control main member 150. The sub-control main member 150 is depicted as a rotary member, although any other suitable member may be used. The sub-control main member 150 is coupled to the secondary linkage 100, the first sub-linkage 110, and the second sub-linkage 130.

The sub-control member 150 is moved via a sub-control manual release 152 or via a sub-control power actuator 154. The sub-control power actuator 154 may be any suitable actuator, though the actuator 154 is depicted as a solenoid in the illustrated embodiment. The power actuator 154 is communicatively coupled to and controlled by the deployment system controller 64 to control the sub-control assembly 82.

Alternatively, when the respective aircraft is on the ground, the sub-control assembly 82 may be controlled via the sub-control manual release 152 also coupled to the sub-control member 150, and engageable through an opening in the housing 52 of the deployment system 50. The sub-control manual release 152 may be a dial, lever, or any other member suitable for being grasped by a technician or manipulated via a tool. In other embodiments the mechanism 54 may not include a sub-control manual release 152 and a technician may directly manipulate the sub-control member 150.

Figure 8:
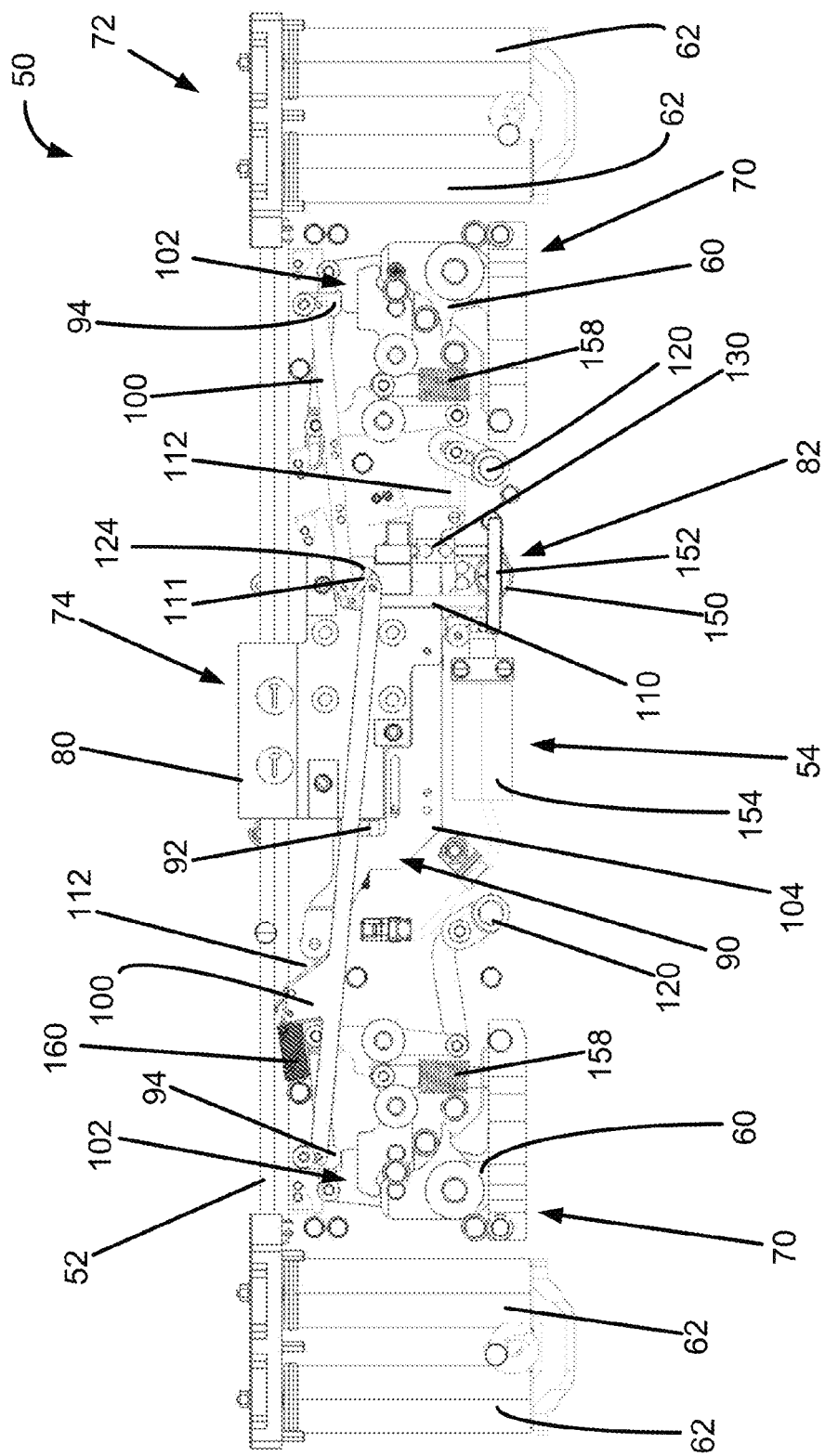
FIG. 8 is a partial cross-sectional, side view of the deployment system of FIG. 3, with the deployment system in a safe state.
Figure 9:
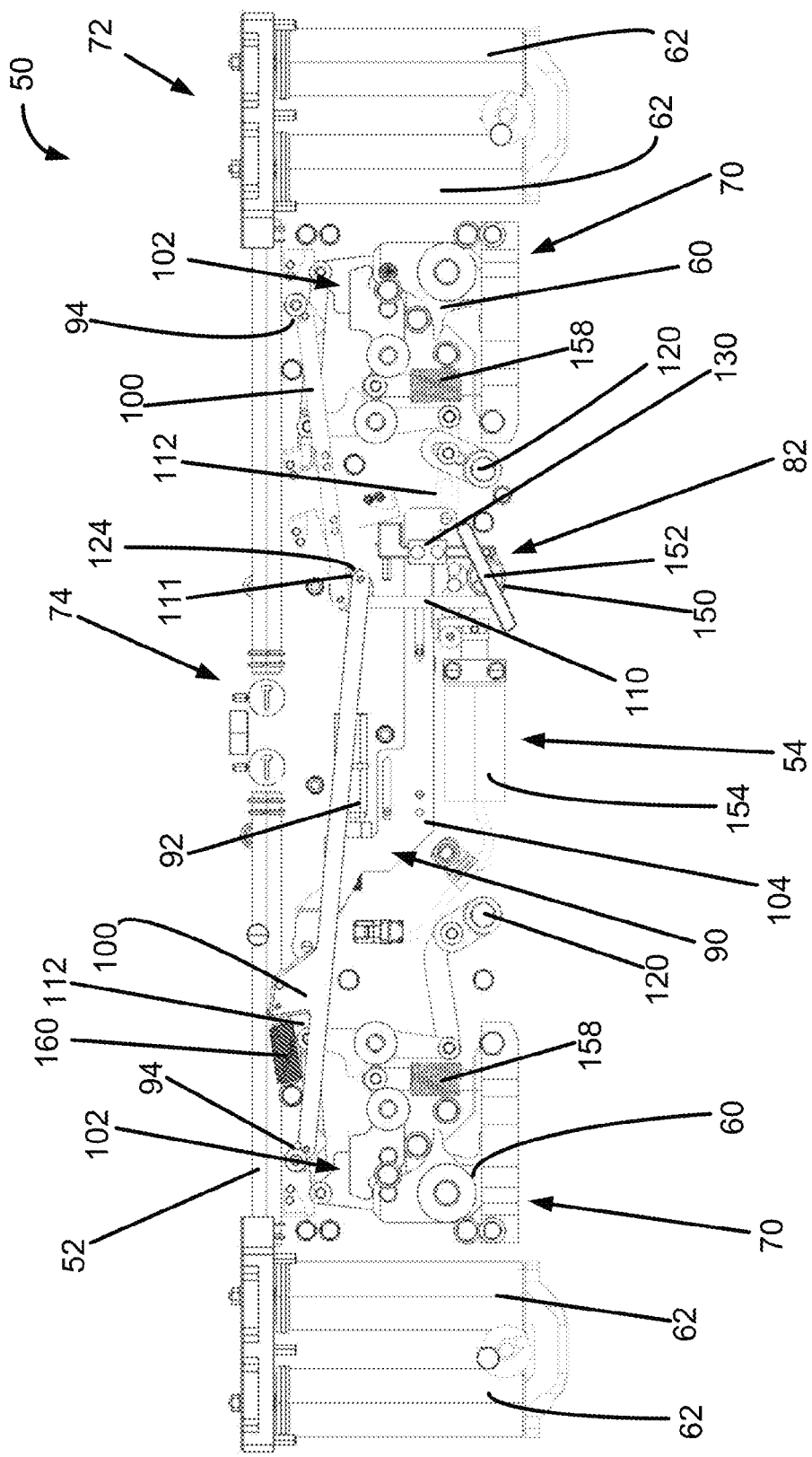
FIG. 9 is a partial cross-sectional, side view of the deployment system of FIG. 3 with the deployment system in a fire state, and with an actuation portion 74 removed for clarity.
Figure 10:
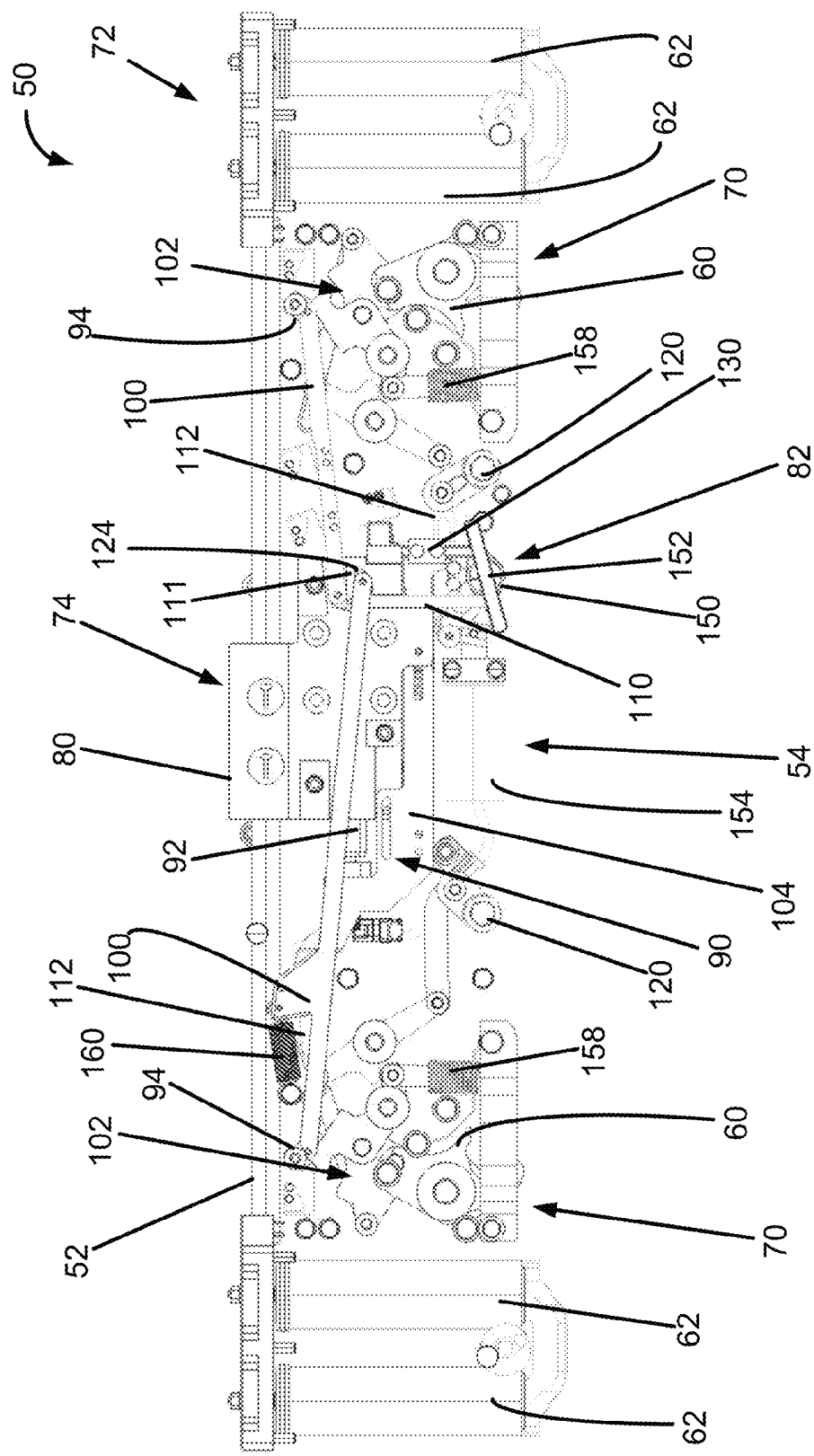
FIG. 10 is a partial cross-sectional, side view of the deployment system of FIG. 3 with the deployment system in a ground state.

Turning now to FIGS. 8-10, the above-described functioning of the deployment system 50 will further be described in terms of various states of the deployment system 50. Manual and powered movement of the sub-control member 150 controls the active state of deployment system 50, moving the mechanism 54 of the deployment system 50 between a safe state (FIG. 8), a fire state (FIG. 9), and a ground state (FIG. 10) as previously described with reference to the deployment system 20 of FIGS. 1 and 2, though applicable to the deployment system 50 of FIGS. 3-7.

The sub-control assembly 82, and thus the sub-control member 150, has multiple positions between which it moves—at least a safe position, a ground position, and a fire position—where each position causes a different movement of each of the secondary linkage 100, the first sub-linkage 110, and the second sub-linkage 130 coupled to the sub-control member 150. Generally, adjustment of each of the secondary linkage 100, the first sub-linkage 110, and the second sub-linkage 130 affects movement or non-movement of the sub-lock lock 94, the release valve 124, and the main linkages 90, thereby affecting movement or non-movement of the lock member 60, the lock actuator 92, and the ejector 62, in turn affecting whether or not the store 56 is secured to or released from the deployment system 50.

The safe state shown in FIG. 8, is utilized at take-off after loading of a store, such as the store 56, to the deployment system 50, during flight, and also in the case that the deployment system controller 64 and/or the master controller 66 detects a fault condition in the deployment system 50. Via the safe state, the release valve 124 is selectively moved to an open state, and the lock actuator 92 and the ejector 62 are selectively prevented from activating.

In the safe state of the deployment system 50, the sub-control assembly 82 is positioned in its safe position. Therefore the sub-control main member 150 is aligned to maintain the release valve 124 in the closed position via the second sub-linkage 130 disposed between the sub-control main member 150 and the release valve 124. Pressure moving through the manifold 80 will move through the power channel 122 to the environment rather than acting on the lock actuator 92 and the ejector 62. The sub-control main member 150 is also aligned to maintain the sub-lock 94 in its secondary position via the secondary linkage 100 disposed between the sub-control main member 150 and the sub-lock 94. This prevents movement of the first portion 102 of the main linkages 90, thus preventing movement of the lock member 60.

In the safe state, the sub-control main member 150 is also aligned to engage the first sub-linkage 110 with the second portion 104 of the main linkages 90. The first sub-linkage 110 is in its first position. Thus the second portion 104 of the main linkages 90 is prevented from moving, also preventing actuation of the lock actuator 92, even if enough pressure were to build in the manifold 80 to begin to move the lock actuator 92.

As described, the sub-control assembly 82 will also be moved into the safe state from the fire state upon detection of a fault condition in the deployment system 50. In such case, the sub-control power actuator 154 may be deactivated via the system controller 64. The main linkages 90 may have already moved via actuation of the lock actuator 92 and if so, movement of the first sub-linkage 110 will not cause re-engagement with the main linkages 90. Further, because the lock actuator 92 will have already actuated, pressure will have begun to build in the ejector 62, or the ejector will have attempted to eject the store with the store remaining attached to the deployment system 50.

Thus in the case of a safe state caused by a fault condition, the sub-control assembly 82 may only function to rapidly selectively re-open the release valve 124 to prevent further movement of any non-actuated ejectors 62 and/or to prevent actuation of the lock actuator 92 thereby preventing movement of any non-disengaged lock members 60. Because de-actuation of the sub-control power actuator 154 may not cause a fast enough opening of the release valve 124 to prevent pressure from continuing to flow towards the ejector 62, a biasing member 160 may be coupled to the second sub-linkage 130 to rapidly move the second sub-linkage 130 and open the release valve 124. As illustrated, the biasing member 160 is coupled to the secondary linkage 100, which is coupled to the release member 124, which is in turn coupled to the second sub-linkage 130, though other suitable constructions may be used. For example, a biasing member may be coupled directly to the second sub-linkage 130.

As shown in FIGS. 4 and 8-10, the biasing member 160 may be a tension spring, while in other embodiments the biasing member 160 may be a compression spring, solenoid, other actuator, or any other suitable member for moving the second sub-linkage 130. It is noted that in a safe state caused by a fault condition, the power valve 140 may also be closed via the deployment system controller 64 to prevent additional flow of pressure into the manifold 80.

Turning now to the fire state shown in FIG. 9, the deployment system 50 may move from the safe state during flight to the fire state upon reaching of a target destination for releasing the store 56. As noted, the deployment system 50 may alternatively move from the fire state to the fault condition safe state upon detection of a system fault.

The fire state is initiated via a fire command from the master controller 66, and as noted, the master arm command will not affect components of the illustrated deployment system 50 moved during the fire state, such as the ejector 62, the sub-control power actuator 154, and/or the lock actuator 92. Via the fire state, the release valve 124 is selectively moved to a closed state, the lock actuator 92 is selectively actuated to disengage the lock member(s) 60 from the store, and the ejector(s) 62 is selectively actuated to eject the store 56 from the deployment system 50.

In the fire state of the deployment system 50, the sub-control assembly 82 is aligned in the fire position, e.g., the sub-control main member 150 is aligned to selectively close the release valve 124 via the second sub-linkage 130. Thus pressure moving through the manifold 80 will move through the power channel 122 to activate the lock actuator 92 and the ejector 62, rather than moving to the environment. The sub-control main member 150 is also aligned to selectively disengage the first sub-linkage 110 from the second portion 104 of the main linkages 90, moving the first sub-linkage to its third position. This allows the lock actuator 92 to move freely, and allows movement of the first portion 102 of the main linkages 90 via the activated lock actuator 92.

In the fire state, the sub-control main member 150 is additionally aligned to selectively move the sub-lock 94 from its primary position to its secondary position via the secondary linkage 100. This allows the second portion 104 of the main linkages 90 to move the first portion 102 of the main linkages 90, in turn moving the lock member(s) 60 from its primary position to its secondary position, in turn disengaging the lock member(s) 60 from the store 56 and removing securement of the store 56 to the deployment system 50. It is noted that during or prior to the fire state the deployment system controller 64 will activate the power valve interrupt 142, allowing electrical actuation power to flow to the power valve 140, enabling pressure to move from the power source 121 into the power channel 122 to act on the lock actuator 92.

Turning now to the ground state shown in FIG. 10, the deployment system 50 may be moved into the ground state from any of the fire state where the store 56 was released, the safe state where no store 56 was released, or the fault condition fire state where the store 56 is classified as a hung store and is still coupled to the deployment system 50 though it should have been released. The ground state depicted in FIG. 10 is initiated via the sub-control manual release 152 acting on the sub-control assembly 82 and via the lock member manual release 120 acting on the lock member 60.

Via the sub-control manual release 152, the sub-control assembly is moved into its ground position, where the sub-lock 94 is selectively disengaged from the first portion 102 of the main linkages 90. This allows the lock member manual release 120 to be used to selectively move the first portion 102 of the main linkages 90. Via the sub-control main member 150, the release valve 124 is selectively moved and maintained in the open position, selectively preventing actuation of the lock actuator 92 and of the ejector 62.

In this ground state, movement of the manual release 120 selectively moves the lock member(s) 60 from its primary position to its secondary position without actuation of the lock actuator 92 or movement of the second portion 104 of the main linkages 90. Thus a hung store may be released from the deployment system 50 without fear of actuation of the ejector(s) 62, and/or a store 56 may be secured to the deployment system 50 without the same fear.

The first sub-linkage 110 is also maintained in its second position, where it is securely engaged with the second portion 104 of the main linkages 90. Thus, even in a fault condition of the release valve 124, the lock actuator 92 is prevented from moving.

In one embodiment, lock member 60 is moved from its secondary position to its primary position upon loading of a store to the deployment system 50. While receiving a latch member of a store into the open lock member 60 (in the secondary position), the lock member 60 is moved via the latch member to its primary position. The locking portion 70 may include a biasing member, such as the biasing member 158, to assist with this movement between the secondary position and the primary position during store loading in the ground state.

As noted, the ground and safe states of the deployment system 50 include numerous safety redundancies. In the ground state, even if the first sub-linkage 110 breaks, disengaging from the main linkages 90, the opening of the release valve 124 will prevent actuation of the lock actuator 92. In the ground or safe states, if the biasing member 160 fails to open the release valve 124 or the release valve 124 remains in the closed state for another reason, the power valve interrupt 142 may be actuated via the system controller 64 to cut electrical actuation power to the power valve 140 to prevent power, e.g., pressure, from continuing to enter the manifold 80 from the power source 121.

Also in the ground or safe states, even if enough pressure builds in the power channel 122 to move the lock actuator 92, a non-broken first sub-linkage 110 engaged with the second portion 104 of the main linkages 90 will prevent the lock actuator 92 from moving, and prevent flow of pressure past the lock actuator 92 to the ejector 62 via the power channel 122. Further, even if one of the controllers 64 or 66 causes accidental actuation of the sub-control power actuator 154 moving the sub-control assembly 82 to its fire position, such as to close the release valve 124 and unlock the first sub-linkage 110 from the second portion 104, the power valve interrupt 142 may not be actuated to allow electrical actuation power to the power valve 140 without also receiving a proper activation code, such as from one of the controllers 64 or 66.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, stores, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A deployment system for deploying a store from an aircraft, the deployment system comprising:

a lock member that selectively secures the store to the deployment system;
an ejector that selectively ejects the store from the deployment system; and
a deployment system controller communicatively coupled to the lock member and to the ejector, wherein the system controller is communicatively coupled to the aircraft to receive commands from the aircraft; and
an actuation mechanism coupled to each of the lock member and the ejector for controlling actuation of each of the lock member and the ejector,
wherein upon receipt of a master arm command from the aircraft the deployment system controller maintains the lock member secured to the store, and wherein upon receipt of a fire command from the aircraft, the system controller disengages the lock member from the store and actuates the ejector to eject the store from the deployment system, and
wherein the actuation mechanism is configured to prevent transfer of full actuation power for the ejector through an actuation manifold to the ejector to eject the store until the lock member has first been disengaged from the store.

2. The deployment system of claim 1, further including
a lock actuator that selectively moves the lock member between a primary position where the lock member is engaged with the store and a secondary position where the lock member is disengaged from the store,
a sub-lock partially releasably coupled to the lock member to prevent movement of the lock member by the lock actuator, and sub-control assembly coupled to the sub-lock, wherein the sub-control assembly selectively moves the sub-lock between a primary position and a secondary position, wherein in the primary position the sub-lock is fully coupled with the lock member and prevents movement of the lock member by the lock actuator, and wherein in the secondary position the sub-lock is partially decoupled from the lock member and allows movement of the lock member by the lock actuator.

3. The deployment system of claim 1, wherein the actuation mechanism includes a sub-control assembly coupled to the lock member and to the ejector,
wherein the sub-control assembly includes a first position to maintain the lock member engaged with the store and to maintain de-actuation of the ejector, and a second position to disengage the lock member from the store and to activate the ejector, wherein the sub-control assembly is not moved from the first position to the second position in response to receipt of the master arm command from the aircraft, and wherein the sub-control assembly is moved from the first position to the second position in response to receipt of the arm command from the aircraft.

4. The deployment system of claim 1, further including
a lock actuator that selectively moves the lock member into disengagement from the store,
a power channel that couples the lock actuator to a power source supplying power to activate the lock actuator, and
a sub-control assembly that couples to the lock member to selectively control movement of the lock member and to the power channel to selectively control actuation of the lock actuator.

5. The deployment system of claim 4, wherein the sub-control assembly is coupled to the lock actuator to prevent movement of the lock actuator.

6. The deployment system of claim 1, further including a power channel that couples the ejector to a power source supplying power to activate the ejector, and
a release member coupled to the ejector, wherein selective movement of the release member controls flow of power through the power channel and to the ejector,
wherein the release member moves between a default open position allowing power to escape the power channel and to bypass the ejector, and a secondary closed position allowing power to actuate the ejector.

7. The deployment system of claim 6, further including a biasing member coupled to the release member that biases the release member in the default open position.

8. A deployment system for deploying a store from an aircraft, the deployment system comprising:
a lock member that selectively secures the store to the deployment system;
a pneumatically actuated lock actuator that selectively moves the lock member between a primary position where the lock member is engaged with the store and a secondary position where the lock member is disengaged from the store;
a pneumatically actuated ejector that ejects the store away from the deployment system; and
a release member that selectively moves between a primary position that prevents both pneumatic actuation of the ejector and of the lock actuator and a secondary position that allows transfer of pressure for actuation of the ejector only after actuation of the lock actuator.

9. The deployment system of claim 8, further including a sub-control assembly that selectively moves the release member between its default and secondary positions, and that selectively engages the lock actuator to prevent movement of the lock actuator.

10. The deployment system of claim 8, further including a biasing member that biases the release member in the primary position.

11. The deployment system claim 8, wherein the lock actuator is a pneumatic cylinder.

12. The deployment system of claim 10, wherein the biasing member is a spring.

13. The deployment system of claim 10, wherein the biasing member is a solenoid.

14. The deployment system of claim 8, further including a sub-lock partially releasably coupled to the lock member, wherein partial disengagement of the sub-lock from the lock member selectively allows the lock actuator to move the lock member between its default and secondary positions.

15. The deployment system of claim 8, further including a manual release coupled to the lock member to move the lock member from its primary position to its secondary position while maintaining the release member in its secondary position.

16. A method of operating a deployment system of an aircraft to release a store from the deployment system, the deployment system including a lock member to selectively engage the store to secure the store to the deployment system, a sub-lock partially releasably coupled to the lock member to selectively engage the lock member to control movement of the lock member, an ejector to selectively eject the store from the deployment system, and a sub-control assembly coupled to each of the lock member, the sub-lock, and the ejector to selectively move each of the lock member, the sub-lock, and the ejector to selectively release and eject the store from the deployment system, the method including:
manually moving the sub-control assembly to a ground position to partially disengage the sub-lock from the lock member to allow movement of the lock member, and thereafter manually moving the lock member to a secondary position disengaged from a default locked position to load a store to the deployment system while the aircraft is grounded;

after loading of a store, manually moving the sub-control assembly to a safe position to fully re-engage the sub-lock with lock member to prevent movement of the lock member in preparation for takeoff of the aircraft; and after moving the sub-control assembly to its safe position, maintaining the sub-control assembly in its safe position to prevent both pneumatically actuated unlocking of the lock member and pneumatic actuation of the ejector upon receipt of a master arm command from a pilot interface communicatively coupled to the deployment system; and upon receipt of a fire command from the pilot interface communicatively coupled to the deployment system, automatically moving the sub-control assembly to a fire position (a) to partially disengage the sub-lock from the lock member to allow movement of the lock member, (b) to move the lock member to a secondary position disengaged from the store, and (c) upon disengaging the lock member from the store, to transfer actuation power via the sub-control assembly to actuate the ejector to elect the store.

17. The method of claim 16, further including moving the sub-control assembly to a safe position from the fire position to prevent actuation of the ejector upon detection of a failed release of the store from the lock member or ejection of the store by the ejector.

18. The method of claim 16, further including preventing actuation of the ejector via the sub-control assembly when the sub-control assembly is manually moved to its ground position.

19. The method of claim 16, further including closing a release member of the deployment system via the sub-control assembly when the sub-control assembly is moved to its fire position to allow actuation power to flow to the ejector to eject the store, and opening the release member via the sub-control assembly when the sub-control assembly is moved to its safe position to prevent actuation power from flowing to the ejector to prevent ejection of the store.

20. The deployment system of claim 1, wherein the actuation mechanism is a pneumatic pressure manifold that is configured to prevent passage of full actuation pressure for the ejector through a channel of the pneumatic pressure manifold to the ejector to eject the store until the lock member has first been disengaged from the store.

* * * * *